US012249909B2

(12) United States Patent
Chiang et al.

(10) Patent No.: US 12,249,909 B2
(45) Date of Patent: Mar. 11, 2025

(54) POWER SUPPLY NOISE REDUCTION BY CURRENT CANCELLATION CIRCUIT

(71) Applicant: Apple Inc., Cupertino, CA (US)

(72) Inventors: Meei-Ling Chiang, Cupertino, CA (US); Khaled M. Alashmouny, Sunnyvale, CA (US); Zhi Hu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/895,587

(22) Filed: Aug. 25, 2022

(65) Prior Publication Data

US 2024/0072651 A1    Feb. 29, 2024

(51) Int. Cl.
   *H02M 1/15*        (2006.01)
   *H02M 1/44*        (2007.01)
   *H02M 3/156*     (2006.01)

(52) U.S. Cl.
   CPC .............. *H02M 1/44* (2013.01); *H02M 1/15* (2013.01); *H02M 3/1566* (2021.05)

(58) Field of Classification Search
   CPC ................................................ H02M 1/14–15
   See application file for complete search history.

(56) References Cited

U.S. PATENT DOCUMENTS

| | | | | |
|---|---|---|---|---|
| 6,462,520 | B1 * | 10/2002 | Mangtani .............. | H02M 3/158 323/271 |
| 7,205,821 | B2 * | 4/2007 | Rutter .............. | H03K 17/04123 327/108 |
| 7,852,155 | B2 | 12/2010 | Chaoui | |
| 8,362,805 | B2 | 1/2013 | Suzuki et al. | |
| 10,095,253 | B2 | 10/2018 | Whidden et al. | |

(Continued)

FOREIGN PATENT DOCUMENTS

| | | | | |
|---|---|---|---|---|
| EP | 1058871 | B1 * | 11/2008 | ............. H02H 3/202 |
| EP | 3851933 | A1 | 7/2021 | |
| JP | 2016119700 | A | 6/2016 | |

OTHER PUBLICATIONS

International Search report and Written opinion of the International Searching Authority for PCTUS2023072570 mailed Dec. 2023. (Year: 2023).*

(Continued)

*Primary Examiner* — Peter M Novak
(74) *Attorney, Agent, or Firm* — Sterne, Kessler, Goldstein & Fox P.L.L.C.

(57) ABSTRACT

The present disclosure describes a circuit having a current source and a load circuit coupled to the current source. The current source can include a transistor electrically coupled to a voltage supply and can be configured to generate a first current with a first current rate-of-change during a time interval, where the first current can be a cancellation current. In addition, the load circuit can be configured to generate a second current with a second current rate-of-change during the same time interval, where the second current can be a load current. The second current rate-of-change can be substantially an inverse of the first current rate-of-change. A power system can include a power management unit configured to generate a power supply voltage at an output, a current source and a load circuit electrically coupled to the output, and a control circuit controls the first current rate-of-change during the time interval.

20 Claims, 9 Drawing Sheets

(56) References Cited

U.S. PATENT DOCUMENTS

| | | | |
|---|---|---|---|
| 11,502,594 B2* | 11/2022 | Angell | H02M 3/158 |
| 2004/0177201 A1 | 9/2004 | Cherniski et al. | |
| 2009/0174481 A1* | 7/2009 | Chang | H03F 3/72 |
| | | | 330/296 |
| 2012/0081091 A1 | 4/2012 | Ito | |
| 2012/0206944 A1 | 8/2012 | Yang et al. | |
| 2012/0293156 A1* | 11/2012 | Galbis | H02M 3/1588 |
| | | | 323/350 |
| 2013/0147452 A1* | 6/2013 | Yang | G05F 1/44 |
| | | | 323/282 |

OTHER PUBLICATIONS

Chung et al., A New Approach For Massive Parallel Scan Design, VTVT Laboratory, Paper 21.3 International Test Conference, 0-7803-9039-3; 10 pages.

International Search Report and Written Opinion of the International Searching Authority directed to related International Patent Application No. PCT/US2023/072570, mailed Dec. 11, 2023; 7 pages.

* cited by examiner

POWER SUPPLY NOISE REDUCTION BY CURRENT CANCELLATION CIRCUIT

FIELD

The present disclosure relates to a power management circuit and, more particularly, to a power management circuit with a current cancellation circuit.

BACKGROUND

Voltage stability of a power supply for an electronic system refers to the ability of the system to restore steady-state voltage of acceptable magnitude after a disturbance, such as sudden power consumption change caused by system activity change. For example, in a power management system supplying a high speed link, events such as connecting a load circuit with high current consumption to the system may cause a sudden current rate-of-change, leading to power supply noise or supply voltage fluctuation. The supply voltage fluctuation can cause power supply noise induced jitter, which is undesirable in electronic systems.

SUMMARY

Embodiments of the present disclosure include a system having a power management circuit configured to generate a voltage supply to a load circuit. The load circuit consuming current at varying times and with varying current demand can cause voltage fluctuations in the system. The load circuit can generate a load current with a load current rate-of-change during a time interval. The system can further include a current source electrically coupled to the voltage supply and the load circuit and configured to generate a cancellation current with a cancellation current rate-of-change during the same time interval, where the load current rate-of-change is substantially an inverse of the cancellation current rate-of-change. As a result, the cancellation current generated by the current source can reduce the voltage fluctuations in the system caused by the load current rate-of-change.

Embodiments of the present disclosure include a circuit having a current source and a load circuit electrically coupled to the current source. The current source can include a transistor electrically coupled to a voltage supply and can be configured to generate a first current with a first current rate-of-change during a time interval, where the first current can be the cancellation current. In addition, the load circuit can be configured to generate a second current with a second current rate-of-change during the same time interval, where the second current can be the load current. The second current rate-of-change can be substantially an inverse of the first current rate-of-change.

Embodiments of the present disclosure also include a system having a power management unit, a current source, a load circuit, and a control circuit electrically coupled to the current source and the load circuit. The power management unit can be configured to generate a power supply voltage at an output. The current source can be electrically coupled to the output and configured to generate a first current with a first current rate-of-change during a time interval. The load circuit can be electrically coupled to the output and configured to generate a second current with a second current rate-of-change during the time interval. The second current rate-of-change is substantially an inverse of the first current rate-of-change. In addition, the control circuit can be configured to control the current source to generate the first current during the time interval.

Embodiments of the present disclosure further include a method for reducing supply voltage fluctuations caused by a load circuit. The method includes generating, by a current source electrically coupled to a voltage supply, a first current with a first current rate-of-change during a time interval. The method also includes generating, by the load circuit electrically coupled to the current source, a second current with a second current rate-of-change during the same time interval. The second current rate-of-change is substantially an inverse of the first current rate-of-change so that the voltage fluctuations caused by the second current rate-of-change of the load circuit can be reduced. The method can further include generating, by the current source, a third current with a third current rate-of-change during a second time interval and having an opposite slope to that of the first current rate-of-change.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

Figure 1:
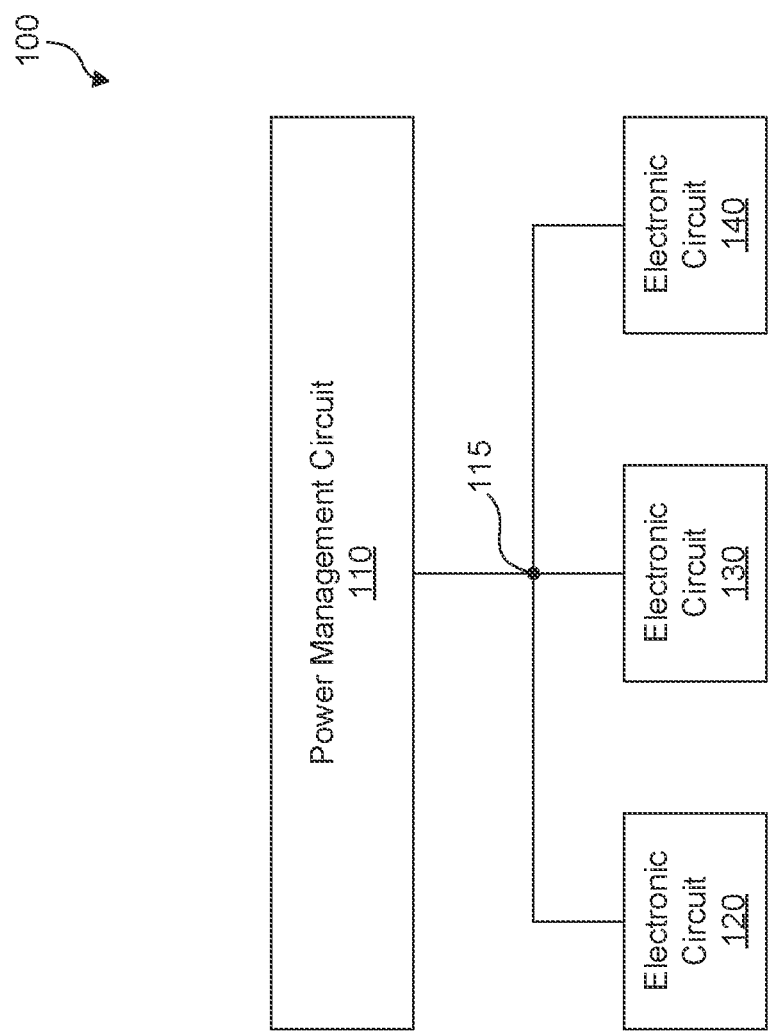
FIG. 1 is an illustration of an electronic system including a power management circuit and a load circuit, according to some embodiments.

The following disclosure provides many different embodiments, or examples, for implementing different features of the provided subject matter. Specific examples of components and arrangements are described below to simplify the present disclosure. These are merely examples and are not intended to be limiting. In addition, the present disclosure repeats reference numerals and/or letters in the various examples. This repetition is for the purpose of simplicity and clarity and, unless indicated otherwise, does not in itself dictate a relationship between the various embodiments and/or configurations discussed.

Voltage stability of an electrical or electronic system refers to the ability of the system to restore steady-state voltage of acceptable magnitude after a certain disturbance, such as connecting a component to the system. In a high-frequency power supply system, events such as connecting a circuit block or a load circuit with high current consumption to the power supply system may cause a sudden large current change or a current rate-of-change (e.g., Di/Dt; also denoted as di/dt). Due to parasitic inductance (L) from power management circuits to on-chip power supply, large Di/Dt can lead to a significant power supply noise or supply voltage fluctuation V=L*Di/Dt. It is desirable to reduce such a supply voltage fluctuation.

The following disclosure describes aspects of a system that includes a current source to generate a cancellation current ($I_{cancel}$) with a cancellation current rate-of-change substantially equal to an inverse of a load current rate-of-change generated by a load circuit. Accordingly, the cancellation current generated by the current source can cancel out or reduce voltage fluctuations caused by a load current change due to the load circuit. In some embodiments, the current source can be a calibrated programmable current sink coupled in parallel with the load circuit to generate the cancellation current, which ramps up or down in the reverse direction of the load current ($I_{load}$) when the load circuit connects to the system. With a priori knowledge of the timing and amplitude of Load, the current source can generate $I_{cancel}$ to cancel out the Di/Dt of $I_{load}$ during the time period T1=[t1a, t1b] when the load circuit connects to the system and during the time period T2=[t2a, t2b] when the load circuit disconnects from the system. In addition, the current source can be charged or discharged before t1a and after t2b with a current having a smaller Di/Dt so that the operation of the current source would not affect the operation of the load circuit or the system.

The embodiments herein can present designs for improved Di/Dt reduction caused by the load circuit compared to other approaches. In addition, a smaller area is used to implement the disclosed current source compared to others approaches to reducing Di/Dt (e.g., the use of large decoupling capacitors to act as a local source of energy for a short time period and to filter out noise). The embodiments herein can be applied to any power supply system, since no special requirement on the load circuit topology is needed or assumed. Accordingly, the embodiments herein can reduce clock deterministic jitter due to power supply noise in clocking circuits and can also reduce high-frequency power supply noise in various circuits and systems, such as high-speed interconnects, active noise equalizers (ANEs), processors, and system on chip (SOC) designs.

FIG. 1 is an illustration of an electronic system 100, according to some embodiments. Electronic system 100 includes a power management circuit 110 and electronic circuits 120, 130, and 140. Electronic system 100 is also referred to herein as a "system." Power management circuit 110 can convert a source of incoming power (e.g., a battery or other suitable power supply source) to desired voltage/current characteristics of electronic circuits 120, 130, and 140, any one or more of which can be a load circuit. In some embodiments, power management circuit 110 provides a supply voltage 115 (e.g., a power supply voltage 115) to electronic circuits 120, 130, and 140 and regulates supply voltage 115 as electronic circuits 120, 130, and 140 vary in voltage and/or current consumption (also referred to herein as "load" or "load circuit"). Supply voltage 115 can be at any suitable voltage level for electronic circuits 120, 130, and 140, such as 1.0 V, 1.2 V, 1.8 V, 2.4 V, 3.3 V, 5.0 V, or any other suitable voltage level. Though electronic system 100 shows power management circuit 110 with a single supply voltage 115 electrically coupled to electronic circuits 120, 130, and 140, electronic system 100 is not limited to such architecture. For example, power management circuit 110 can provide different supply voltages to one or more of electronic circuits 120, 130, and 140 and/or electrically connect to one or more of these circuits. These other architectures are within the scope of the present disclosure.

Electronic circuits 120, 130, and 140 can be any suitable type of electronic device, such as a processor circuit, a memory circuit, an input/output (I/O) circuit, a peripheral circuit, and combinations thereof. In some embodiments, the processor circuit can include a general-purpose processor to perform computational operations, such as a central processing unit. The processor circuit can also include other types of processing units, such as a graphics processing unit, an application-specific circuit, and a field-programmable gate array circuit. In some embodiments, the memory circuit can include any suitable type of memory, such as Dynamic Random Access Memory, Static Random Access Memory, Read-Only Memory, Electrically Programmable Read-Only Memory, non-volatile memory, and combinations thereof.

In some embodiments, the I/O circuit can coordinate data transfer between one of electronic circuits 120, 130, and 140 (e.g., a processor circuit) and a peripheral circuit. The I/O circuit can implement a version of Universal Serial Bus protocol or IEEE 1394 (Firewire®) protocol, according to some embodiments. Further, in some embodiments, the I/O circuit can perform data processing to implement networking standards, such as an Ethernet (IEEE 802.3) networking standard. Examples of the peripheral circuit can include storage devices (e.g., magnetic or optical media-based storage devices, including hard drives, tape drives, CD drives, DVD drives, and any suitable storage device), audio processing systems, and any suitable type of peripheral circuit, according to some embodiments.

Figure 2A:
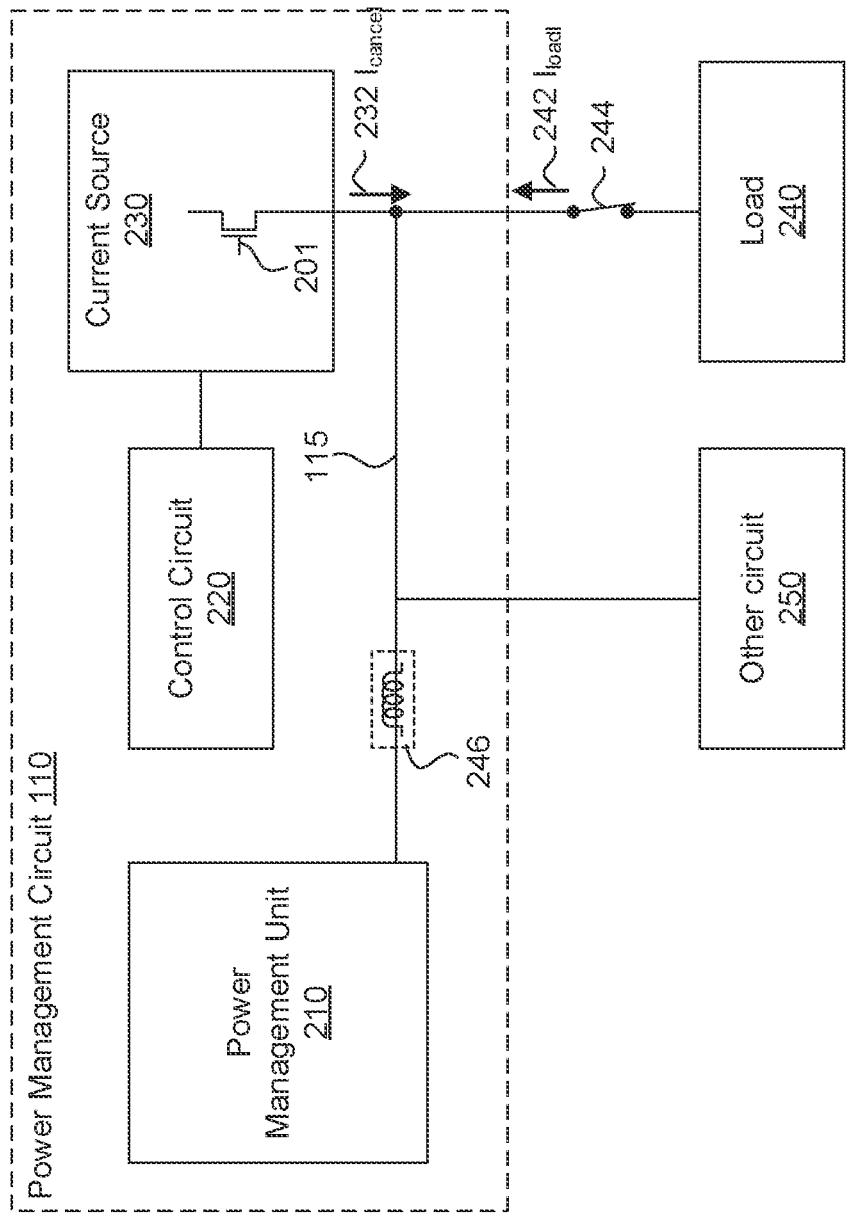
FIG. 2A is an illustration of a block-level representation of a load circuit coupled to a power management circuit that includes a current source, according to some embodiments.

FIG. 2A is an illustration of a block-level representation of a load circuit 240 coupled to a power management circuit 110 that includes a current source 230, according to some embodiments. Power management circuit 110 can include a power management unit 210 configured to generate supply voltage 115, a control circuit 220, and current source 230. Current source 230 includes a transistor 201 electrically coupled to voltage supply 115. Power management circuit 110 can be coupled to load circuit 240 and another circuit 250.

In some embodiments, supply voltage 115 can be a power supply voltage to load circuit 240. The voltage level of supply voltage 115 can be at any suitable voltage level for load circuit 240, such as 1.0 V, 1.2 V, 1.8 V, 2.4 V, 3.3 V, 5.0 V, or any other voltage level.

In some embodiments, load circuit 240 can be any one or more of electronic circuits 120, 130, and 140 shown in FIG. 1, and other circuit 250 can be the remainder of electronic circuits 120, 130, and 140. Because electronic circuits 120, 130, and 140 can have varying loads, load circuit 240 can transition to different voltage levels. For example, load circuit 240 can transition from requiring a first supply voltage to a second supply voltage, where the second supply voltage is lower than the first supply voltage.

Load circuit 240 can be coupled to current source 230 through a switch 244 that connects power management circuit 110 to load circuit 240. When load circuit 240 connects to power management circuit 110, a load current ($I_{load}$) 242 can have a first current value that stabilizes after a time interval. Similarly, when load circuit 240 disconnects from power management circuit 110, $I_{load}$ 242 can have a second current value that stabilizes after a time interval. The first current value can be higher than a second current value of $I_{load}$ 242. Accordingly, the change of $I_{load}$ 242 can be measured by a current rate-of-change, e.g., Di/Dt during a time interval. Due to a parasitic inductance (L) 246 from power management unit 210 to provide voltage supply 115, the current rate-of-change Di/Dt for load current ($I_{load}$) 242 can lead to a supply voltage fluctuation V=L*Di/Dt, which can cause operational problems for other circuit 250.

In some embodiments, current source 230 can generate a cancellation current ($I_{cancel}$) 232. $I_{cancel}$ 232 can have a first current rate-of-change during a time interval, and load current ($I_{load}$) 242 can have a second current rate-of-change during the time interval, where the second current rate-of-change can be substantially an inverse of the first current rate-of-change. Hence, in some embodiments, $I_{cancel}$ 232 can reduce the supply voltage fluctuation V=L*Di/Dt caused by $I_{load}$ 242 to substantially near zero. There can be various designs for current source 230, some of which are shown below.

Figure 2B:
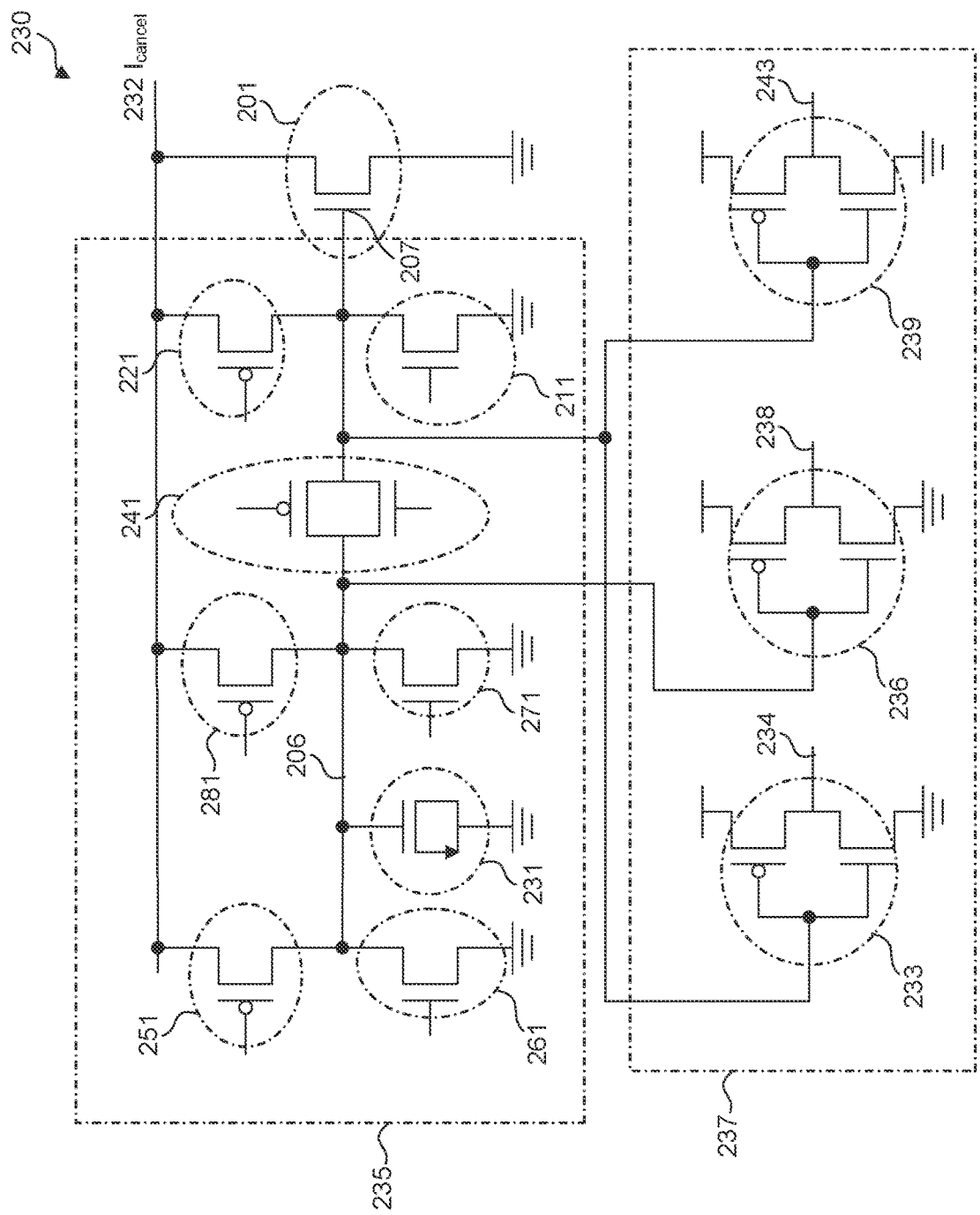
FIG. 2B is an illustration of a current source of a power management circuit, according to some embodiments.

FIG. 2B is an illustration of current source 230, according to some embodiments.

Current source 230 can include transistor 201, which can be referred to as a "current sink." In some embodiments, transistor 201 can be an n-channel metal-oxide semiconductor (NMOS) transistor configured to function as a programmable current sink (e.g., when operating in the saturation region of the transistor). Additionally and alternatively, transistor 201 can be replaced by one or more equivalent devices to perform the same functions. In some embodiments, transistor 201 can be replaced by an array of transistors. A gate terminal 207 of transistor 201 can be coupled to a gate voltage controller 235. Gate voltage controller 235 can be used to control transistor 201 so that the sinking current can ramp up/down at desired rates at desired times. Gate voltage controller 235 can include a transistor 211, a transistor 221, a transmission gate 241, a transistor 271, a transistor 281, a capacitor 231, a transistor 251, and a transistor 261.

In addition, current source 230 can further include a gate voltage sensor circuit 237 coupled to gate terminal 207 of transistor 201. Gate voltage sensor circuit 237 can assess whether a current ramp up procedure has completed by sensing the gate voltage at gate terminal 207. For example, gate voltage sensor circuit 237 can detect the voltage level at gate terminal 207, and the detected voltage level can be compared to the voltage level of operation states of load current ($I_{load}$) 242 based on a priori knowledge of the timing and amplitude of load current (Load) 242. When the voltage level at gate terminal 207 is equal to an operational voltage of load circuit 240 based on the amplitude of load current ($I_{load}$) 242, the current ramp up procedure has been completed. As shown, gate voltage sensor circuit 237 can include a plurality of inverters, such as an inverter 233, an inverter 236, and an inverter 239. There can be other designs for gate voltage sensor circuit 237. Gate voltage sensor circuit 237 can be coupled to control circuit 220 to control the operations of current source 230. For example, control circuit 220 may receive the voltage level of gate terminal 207 detected by gate voltage sensor circuit 237 and compare the received voltage level of gate terminal 207 with the voltage level of operation states of load current ($I_{load}$) 242 based on a priori knowledge of the timing and amplitude of load current ($I_{load}$) 242. A threshold voltage of inverter 233 is adjusted so when a voltage at gate terminal 207 rises from 0 to a high enough value to produce $I_{cancel}$ from transistor 201, a voltage at output 234 of inverter 233 can change from high to low indicating the slow charge through transistor 251 needs to end, as shown at time t3a in FIG. 3. A threshold voltage of inverter 236 is adjusted so when voltage at line 206 rises from 0 to a high enough value to produce $I_{cancel}$ from transistor 201, a voltage at output 238 of inverter 236 can change from high to low indicating the fast charge through transistor 281 needs to end, as shown at time t2b in FIG. 3. A threshold voltage of inverter 239 is adjusted so when a voltage at gate terminal 207 rises from 0 to a high enough value to produce $I_{cancel}$ from transistor 201, a voltage at output 243 of inverter 239 can change from high to low indicating the fast charge through transistor 221 needs to end, as shown at time t2b in FIG. 3.

In some embodiments, the transistors shown in FIG. 2B as NMOS transistors or PMOS transistors are merely for examples, and are not limiting. Some NMOS transistors can be replaced by PMOS transistors or other device performing the same or similar functions. Accordingly, gate voltage controller 235 can have different alternative designs. For example, in some embodiments, an NMOS transistor can be replaced by a PMOS transistor to perform similar functions.

Figure 3:
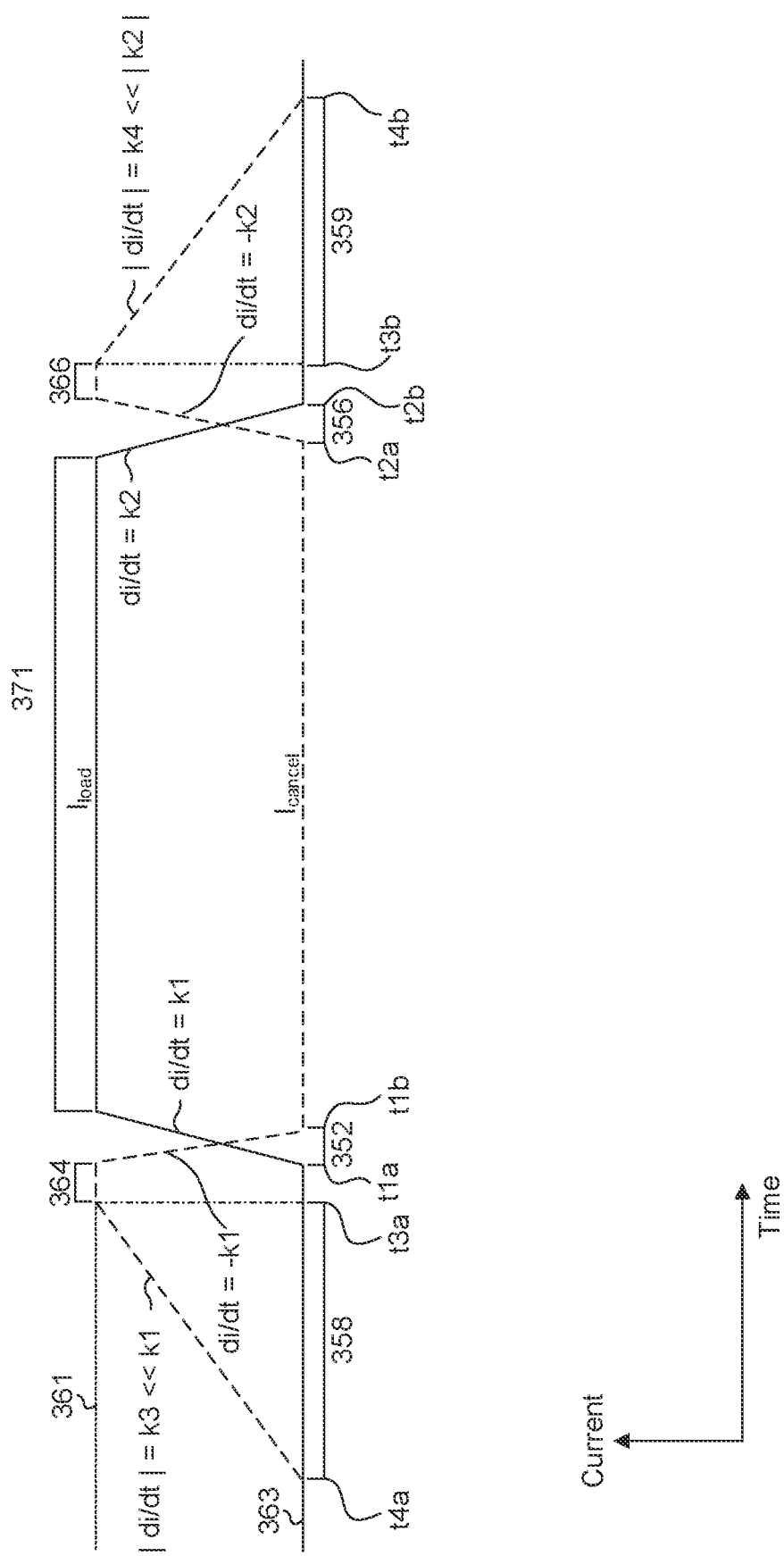
FIG. 3 is an illustration of a first current generated by a current source of a power management circuit and a second current generated by a load circuit, according to some embodiments.

FIG. 3 is an illustration of a first current (cancellation current $I_{cancel}$) generated by current source 230 of power management circuit 110 and a second current (load current $I_{load}$) generated by load circuit 240, according to some embodiments. FIGS. 4A-4D are illustrations of current source 230 and its operations for generating cancellation current $I_{cancel}$, according to some embodiments.

A time interval 352 can represent T1=[t1a, t1b], where t1a is a beginning time or beginning of the time interval T1, and t1b is an end time or end of the time interval T1. Similarly, a time interval 356 can represent T2=[t2a, t2b], a time interval 358 can represent T3=[t4a, t3a], a time interval 364 can represent T4=[t3a, t1a], a time interval 371 can represent T5=[t1b, t2a], a time interval 366 can represent T6=[t2b, t3b], and a time interval 359 can represent T7=[t3b, t4b]. Along the time axis, the time intervals are arranged in a sequence starting from T3=[t4a, t3a], followed by T4=[t3a, t1a], T1=[t1a, t1b], T5 [t1b, t2a], T2=[t2a, t2b], T6=[t2b, t3b], and T7=[t3b, t4b].

During time interval 352, T1=[t1a, t1b], switch 244 can connect power management circuit 110 to load circuit 240, and load current $I_{load}$ for load circuit 240 can change from a current value 363 at the beginning t1a of time interval 352 to a current value 361 at the end t1b of time interval 352, with a current rate-of-change di/dt=k>0. Since load circuit 240 is connected to power management circuit 110, $I_{load}$ is increased from the beginning t1a to the end t1b, and value 361 is higher than value 363. A current value can be referred to as a "value." The current rate-of-change di/dt=k1 may cause voltage fluctuations in system 100.

Accordingly, current source 230 can generate cancellation current $I_{cancel}$, which can change from current value 361 at the beginning t1a of time interval 352 to current value 363 at the end t1b of time interval 352, with a current rate-of-change di/dt=−k1<0, which is substantially the inverse of k1. In some embodiments, $I_{cancel}$ can have a value substantially equal to current value 361 at the beginning t1a and have a value substantially equal to current value 363 at the end t1b. Since the current rate-of-change di/dt for $I_{cancel}$ is substantially the inverse of the current rate-of-change di/dt for $I_{load}$, the voltage fluctuations caused by load can be substantially cancelled out or reduced to near zero.

Figure 4A:
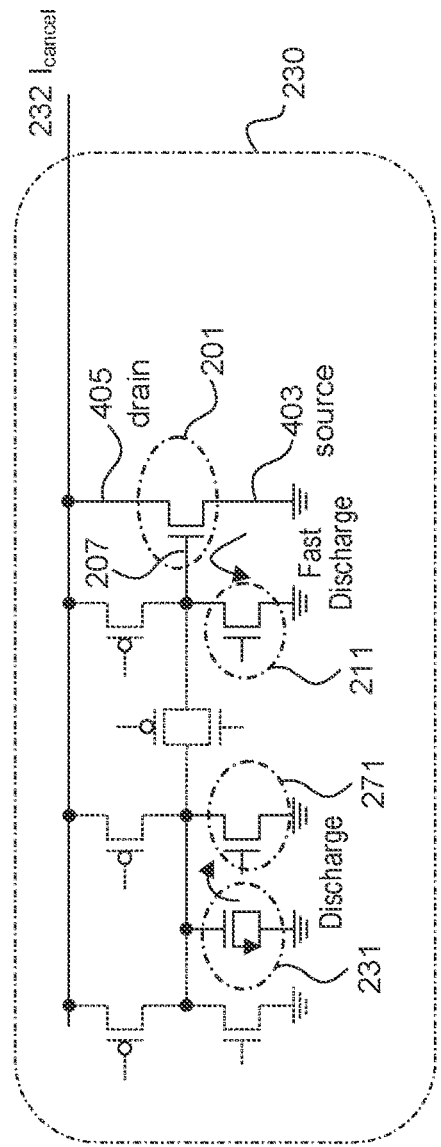
FIGS. 4A-4D are illustrations of a current source and its operations, according to some embodiments.

In some embodiments, as shown in FIG. 4A, during time interval 352, T1=[t1a, t1b], current source 230 can include transistor 211 coupled to the gate terminal 207 of transistor 201 and configured to discharge gate terminal 207 of transistor 201 when the current rate-of-change for $I_{cancel}$ is negative. In some embodiments, transistor 211 can be an NMOS transistor configured to discharge transistor 201. In addition, transistor 201 can have a source 403 coupled to ground (e.g., 0 V) and a drain 405 coupled to current 232, which represents $I_{cancel}$. Similarly, current source 230 can include transistor 271 coupled to capacitor 231 and configured to discharge capacitor 231. In some embodiments, transistor 271 can be an NMOS transistor configured to discharge capacitor 231. Capacitor 231 can store charge such that $I_{cancel}$ is at current value 361 at the beginning t1a of time interval 352. Accordingly, capacitor 231 is charged during time interval 358, T3=[t4a, t3a], and kept stable during time interval 364, T4=[t3a, t1a] including the beginning t1a of time interval 352. Other parts or components of current source 230 may be inactive, as controlled by control circuit 220.

Figure 4B:
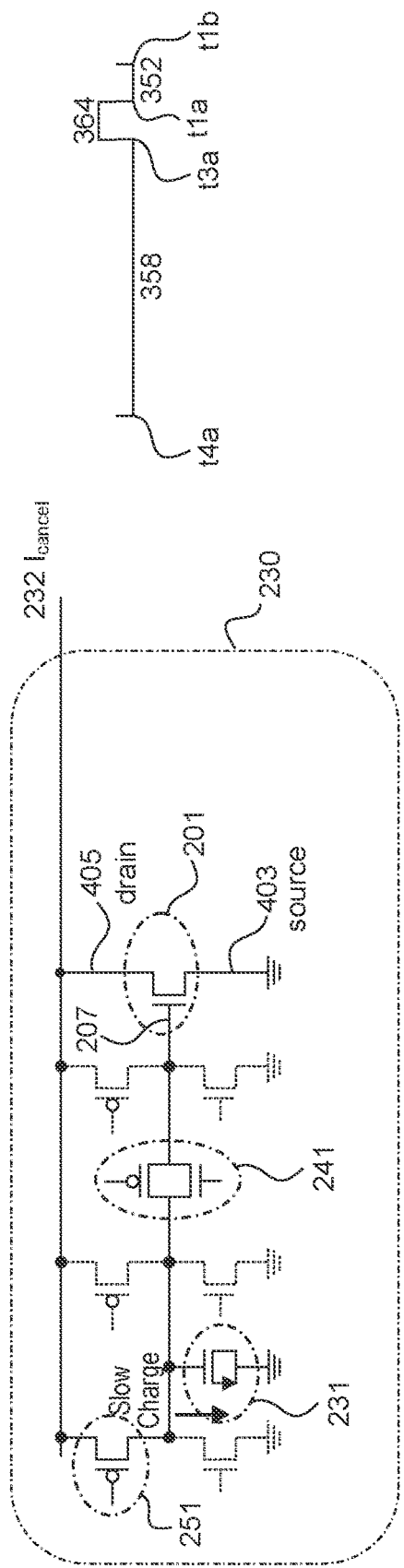

As shown in FIG. 4B, during time interval 358, T3=[t4a, t3a], $I_{load}$ for load circuit 240 can stay stable at a current value 363. Current source 230 can generate $I_{cancel}$, which changes from value 363 to value 361. Current source 230 can include transistor 251 coupled to gate terminal 207 of transistor 201 through transmission gate 241 and configured to charge capacitor 231 to store energy so that capacitor 231 can be discharged in a later time interval, such as T1=[t1a, t1b], while other components of current source 230 are inactive.

During time interval 358, T3=[t4a, t3a], $I_{cancel}$ changes from value 363 to value 361 with a current rate-of-change di/dt=k3<k1, which means the current rate-of-change di/dt at T3 [t4a, t3a] has an opposite slope to that of the current rate-of-change at T1=[t1a, t1b]. In some embodiments, an absolute value of the current rate-of-change di/dt at T3=[t4a, t3a] is less than an absolute value of the current rate-of-change at T1=[t1a, t1b], so $I_{cancel}$ would not impact the operations of system 100 during T3=[t4a, t3a]. In some embodiments, transistor 251 can be a PMOS transistor coupled to capacitor 231 to charge capacitor 231.

During time interval 364, T4=[t3a, t1a], load for load circuit 240 can be stable at value 363, while $I_{cancel}$ is also stable at value 361 to prepare to be discharged at time interval 352, T1=[t1a, t1b] as shown above.

During time interval 371, T5 [t1b, t2a], $I_{load}$ for load circuit 240 can be stable at value 361 to be operational to perform its intended function, while $I_{cancel}$ remains at value 363.

As shown in FIG. 3, during time interval 356, T2=[t2a, t2b], switch 244 can disconnect power management circuit 110 from load circuit 240, and load for load circuit 240 can change from current value 361 at the beginning t2a of time interval 356 to current value 363 at the end t2b of time interval 356, with a current rate-of-change di/dt=k2. In some embodiments, k2 can be substantially the same as k1. In some embodiments, k2 can be different from k1.

Accordingly, current source 230 can generate $I_{cancel}$, which can change from current value 363 at the beginning t2a of time interval 356 to current value 361 at the end t2b of time interval 356, with a current rate-of-change di/dt=−k2. In some embodiments, −k2 is substantially the inverse of k2.

Figure 4C:
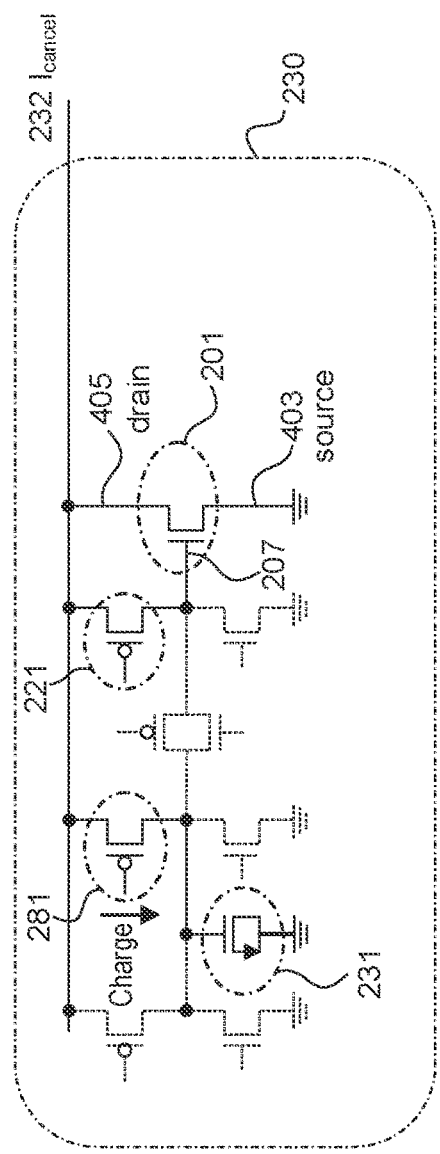

In some embodiments, as shown in FIG. 4C, during time interval 356, T2=[t2a, t2b], current source 230 can include transistor 221 coupled to gate terminal 207 of transistor 201 and configured to charge gate terminal 207 of transistor 201. Similarly, current source 230 can include transistor 281 coupled to capacitor 231 and configured to charge capacitor 231. In some embodiments, transistor 221 and transistor 281 can be PMOS transistors, while transistor 201 and capacitor 231 can be charged by the PMOS transistors.

After time interval 356, during time interval 366, T6=[t2b, t3b], $I_{load}$ for load circuit 240 can be stable at value 363. Similarly, $I_{cancel}$ can be stable at value 361.

Figure 4D:
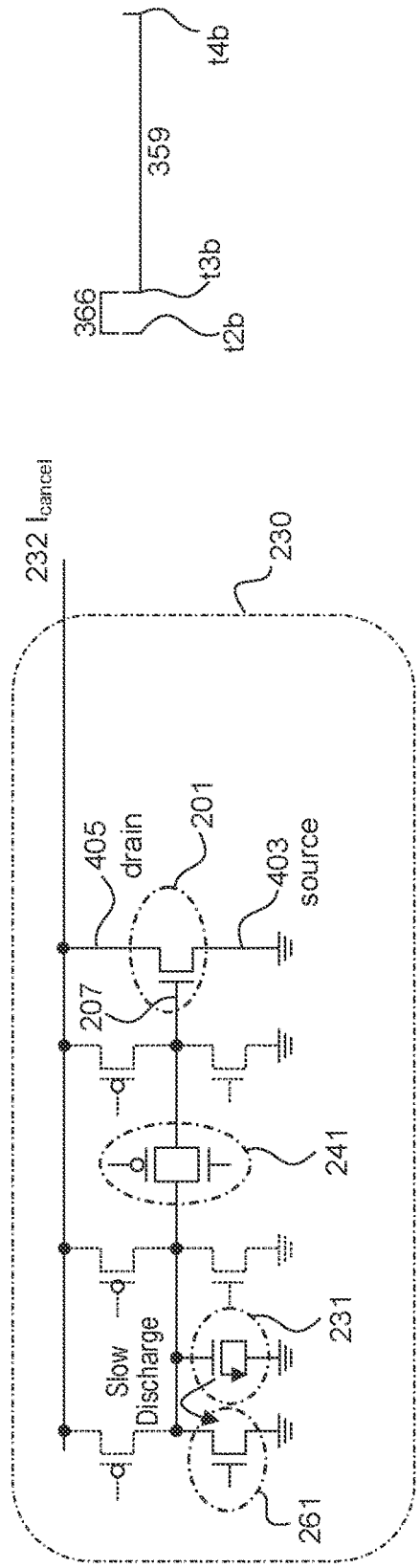

Afterwards, as shown in FIGS. 3 and 4D, during time interval 359, T7=[t3b, t4b], current source 230 can generate $I_{cancel}$, which changes from value 361 to value 363. Current source 230 can include transistor 261 coupled to gate source terminal 207 through transmission gate 241 and coupled to capacitor 231 to discharge both transistor 201 and capacitor 231. In some embodiments, transistor 261 can be an NMOS transistor, and transistor 201 and capacitor 231 can be discharged by transistor 261. Current source 230 can generate $I_{cancel}$ with a current rate-of-change k4 having an opposite slope to that of the current rate-of-change di/dt=−k2 and an absolute value of the current rate-of-change k4 is less than an absolute value of the current rate-of-change−k2.

In some embodiments, as shown in FIGS. 4A and 4C, the current rate-of-change di/dt for $I_{cancel}$ can be the inverse of the current rate-of-change di/dt for $I_{load}$ for load circuit 240. In some embodiment, the current rate-of-change di/dt for cancellation current $I_{cancel}$ can vary slightly in comparison with the current rate-of-change di/dt for load current $I_{load}$. The slight difference between the two current rate-of-change di/dt can be caused by various reasons in design and implementation. For example, the detection, control and coordination of $I_{cancel}$ and $I_{load}$ during time intervals T1=[t1a, t1b] and T2=[t2a, t2b] can have a small offset, resulting in $I_{cancel}$ not being generated at exactly the same time when $I_{load}$ starts to change. In addition, the precise control of the values for $I_{cancel}$ and $I_{load}$ and the exact current rate-of-change di/dt can also have a small offset. In the disclosed embodiments, the offsets in timing and current can be minimized by various design techniques, such as transistor matching techniques and the use of decoupling capacitors to absorb high-frequency current spikes due to imperfect cancellation.

Figure 5:
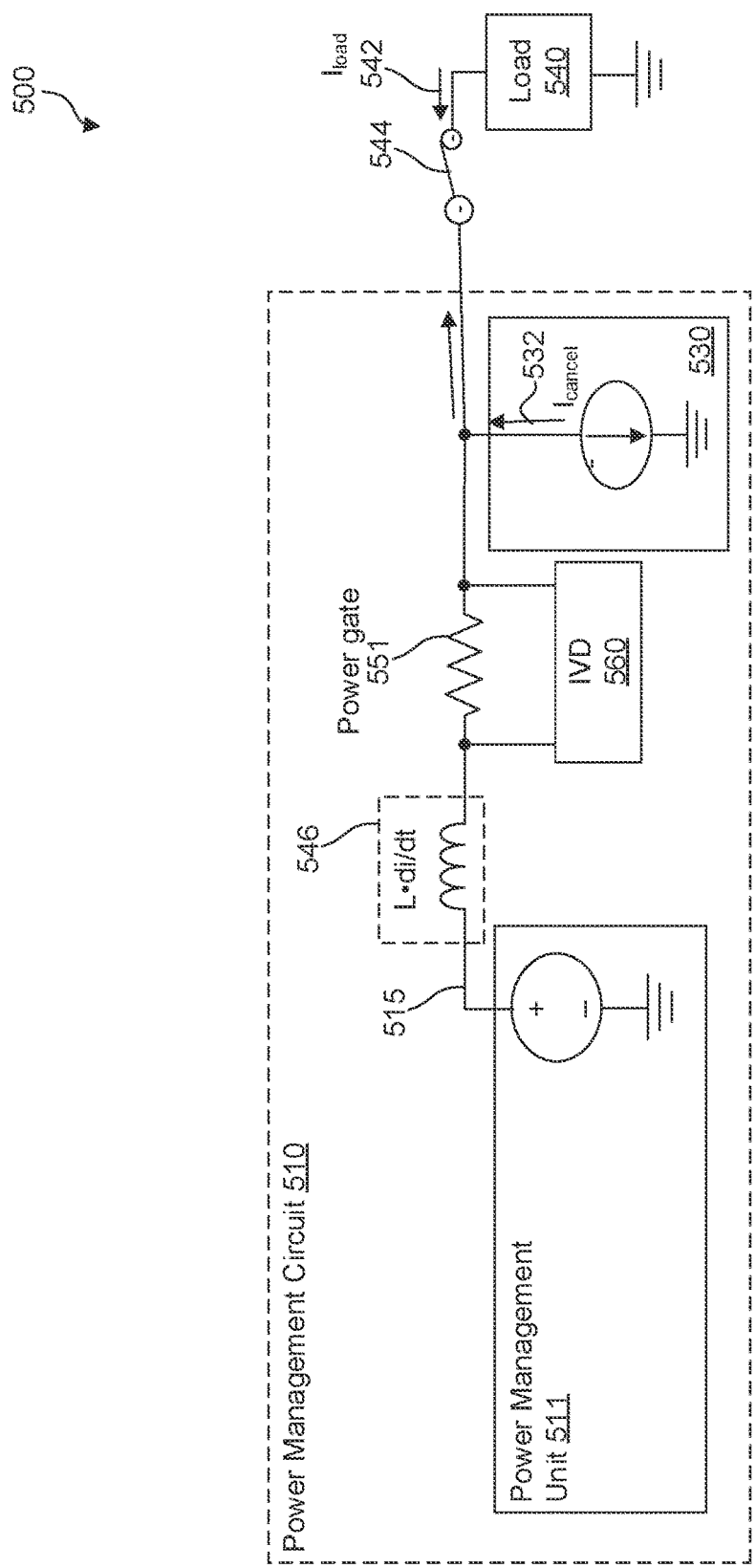
FIG. 5 is an illustration of an electronic system including a power management circuit having a current source coupled to a load circuit, according to some embodiments.

FIG. 5 is an illustration of an electronic system 500 including a power management circuit 510 having a current source 530 coupled to a load circuit 540, according to some embodiments. System 500 may be an example of system 100, while power management circuit 510, current source 530, and load circuit 540 can be examples of power management circuit 110, current source 230, and load circuit 240, respectively, as shown in FIG. 2.

In some embodiments, power management circuit 510 can include a power management unit 511 configured to generate a voltage supply 515, where a control circuit (not shown) and current source 530 can be electrically coupled to voltage supply 515. Current source 530 may be similarly implemented as current source 230 shown in FIG. 2B. $I_{load}$ circuit 540 can be coupled to current source 530 through a switch 544 that can connect power management circuit 510 to load circuit 540. When load circuit 540 connects to power management unit 511, a load current ($I_{load}$) 542 can have a first current value that stabilizes after a time interval. Similarly, when load circuit 540 disconnects from power management unit 511, load 542 can have a second current value that stabilizes after a time interval. The first current value can be higher than a second current value of $I_{load}$. Accordingly, the change of $I_{load}$ 542 can be measured by a current rate-of-change, e.g., a large Di/Dt during a time interval. Due to parasitic inductance (L) 546 from power management circuit 510 to provide voltage supply 515, the current rate-of-change Di/Dt for $I_{load}$ 542 can lead to a supply voltage fluctuation V=L*Di/Dt.

In some embodiments, current source 530 can generate a cancellation current ($I_{cancel}$) 532 having a current rate-ofchange (e.g., a Di/Dt) that is substantially the inverse of the current rate-of-change (e.g., a Di/Dt) for $I_{load}$ 542 during the same time interval to cancel out the supply voltage fluctuation. In some embodiments, the exact current rate-of-change (e.g., Di/Dt) for $I_{cancel}$ 532 may have a small difference compared to the current rate-of-change (e.g., Di/Dt) for $I_{load}$ 542. A circuit 560 can be used to measure the instantaneous voltage drop (IVD) across a resistive power gate 551, which can be used to calibrate the difference between the two current rates-of-change Di/Dt for $I_{load}$ 542 and $I_{cancel}$ 532. Direct current (DC) can be observed by measuring an IR drop across resistive power gate 551, and calibration can be performed by programming the current sink transistor of current source 530 to control the di/dt of the cancellation current.

Figure 6:
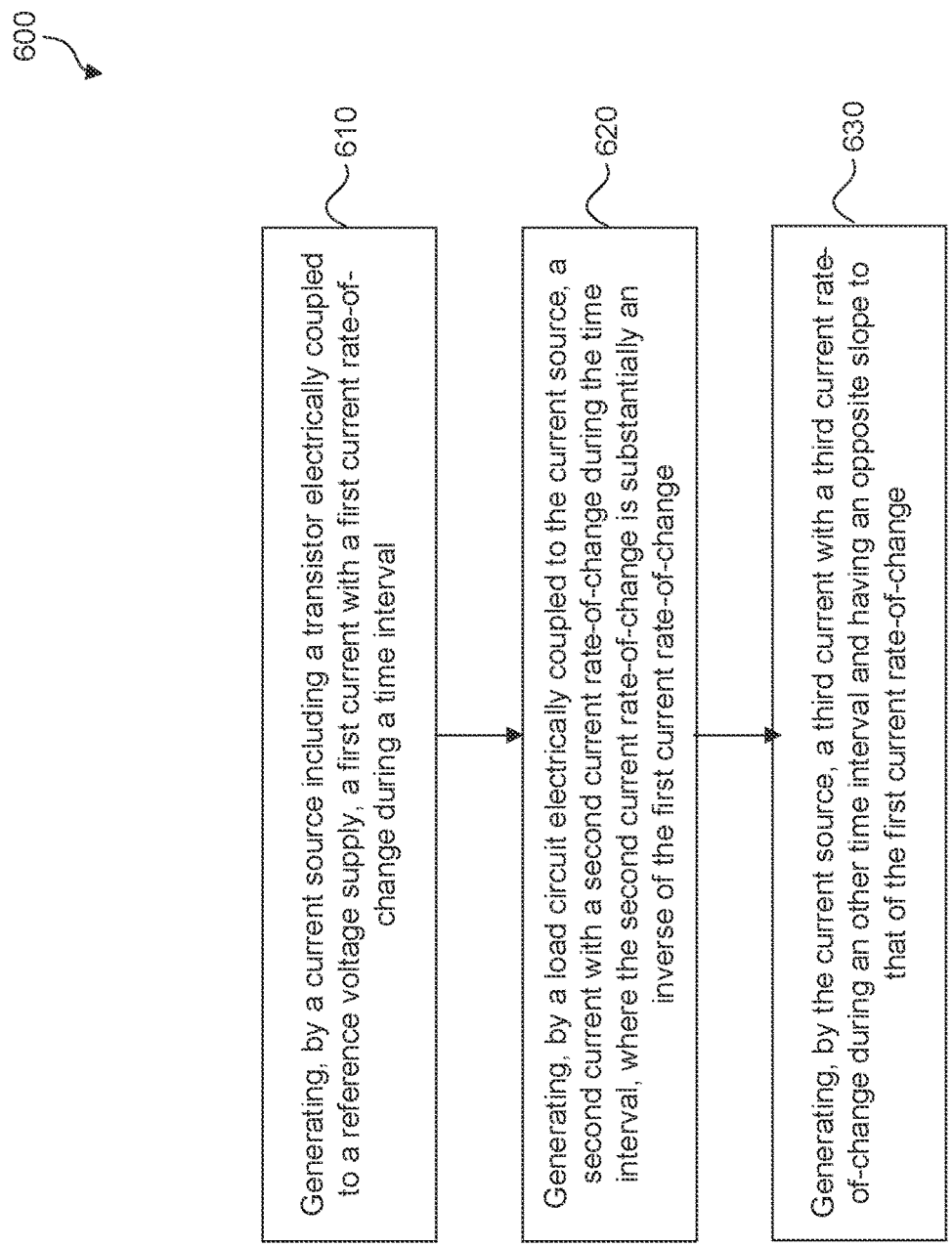
FIG. 6 is an illustration of a method using a current source for reducing voltage fluctuations in a system caused by a load circuit, according to some embodiments.

FIG. 6 is an illustration of a method 600 using a current source for reducing voltage fluctuations in a system caused by a load circuit, according to some embodiments. For illustrative purposes, the operations illustrated in method 600 will be described with reference to power management circuit 110 shown in FIGS. 1, 2A-2B, and 3. Other representations of power management circuit 110, such as power management circuit 510 of FIG. 5, are within the scope of the present disclosure. Also, additional operations may be performed between various operations of method 600 and may be omitted merely for clarity and ease of description. The additional operations can be provided before, during, and/or after method 600, in which one or more of these additional operations are briefly described herein. Moreover, not all operations may be needed to perform the disclosure provided herein. Additionally, some of the operations may be performed simultaneously or in a different order than shown in FIG. 6. In some embodiments, one or more other operations may be performed in addition to or in place of the presently-described operations.

At operation 610, a current source can generate a first current with a first current rate-of-change during a time interval, where the current source can be electrically coupled to a voltage supply. For example, as shown in FIGS. 1, 2A-2B, and 3, current source 230 can generate a first current $I_{cancel}$ with a first current rate-of-change -k1 during a time interval [t1a, t1b]. In addition, current source 230 can generate a first current $I_{cancel}$ with a first current rate-of-change -k2 during a time interval [t2a, t2b].

At operation 620, a load circuit can generate a second current with a second current rate-of-change during the time interval, where the load circuit can be electrically coupled to the current source and the second current rate-of-change is substantially an inverse of the first current rate-of-change. For example, as shown in FIGS. 1, 2A-2B, and 3, load circuit 240 can generate a second current $I_{load}$ with a second current rate-of-change k1 during a time interval [t1a, t1b]. The second current rate-of-change k1 can be substantially an inverse of the first current rate-of-change -k1. In addition, load circuit 240 can generate a second current $I_{load}$ with a second current rate-of-change k2 during a time interval [t2a, t2b]. The second current rate-of-change k2 can be substantially an inverse of the first current rate-of-change -k2.

At operation 630, the current source can generate a third current with a third current rate-of-change during an other time interval and having an opposite slope to that of the first current rate-of-change. For example, current source 230 can generate a third current $I_{cancel}$ with a third current rate-of-change k3 during an other time interval [t4a, t3a] and having an opposite slope to that of the first current rate-of-change -k1. In addition, current source 230 can generate a third current $I_{cancel}$ with a third current rate-of-change k4 during an other time interval [t3b, t4b] and having an opposite slope to that of the first current rate-of-change -k2.

Figure 7:
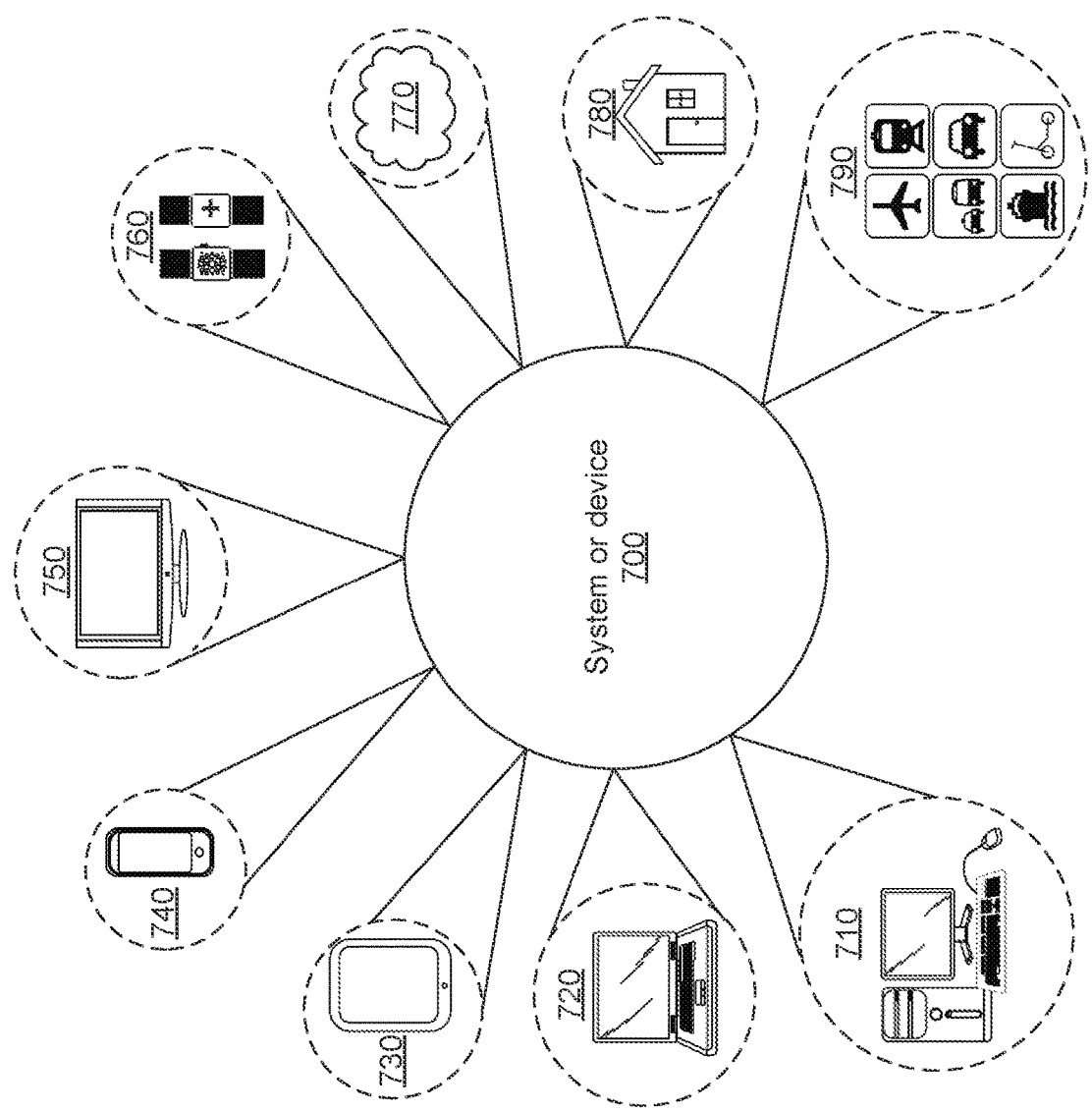
FIG. 7 is an illustration of exemplary systems or devices that can include the disclosed embodiments.

FIG. 7 is an illustration of exemplary systems or devices that can include the disclosed embodiments. System or device 700 can incorporate one or more of the disclosed embodiments in a wide range of areas. For example, system or device 700 can be implemented in one or more of a desktop computer 710, a laptop computer 720, a tablet computer 730, a cellular or mobile phone 740, and a television 750 (or a set-top box in communication with a television).

Also, system or device 700 can be implemented in a wearable device 760, such as a smartwatch or a health-monitoring device. In some embodiments, the smartwatch can have different functions, such as access to email, cellular service, and calendar functions. Wearable device 760 can also perform health-monitoring functions, such as monitoring a user's vital signs and performing epidemiological functions (e.g., contact tracing and providing communication to an emergency medical service). Wearable device 760 can be worn on a user's neck, implantable in user's body, glasses or a helmet designed to provide computer-generated reality experiences (e.g., augmented and/or virtual reality), any other suitable wearable device, and combinations thereof.

Further, system or device 700 can be implemented in a server computer system, such as a dedicated server or on shared hardware that implements a cloud-based service 770. System or device 700 can be implemented in other electronic devices, such as a home electronic device 780 that includes a refrigerator, a thermostat, a security camera, and other suitable home electronic devices. The interconnection of such devices can be referred to as the "Internet of Things" (IoT). System or device 700 can also be implemented in various modes of transportation 790, such as part of a vehicle's control system, guidance system, and/or entertainment system.

The systems and devices illustrated in FIG. 7 are merely examples and are not intended to limit future applications of the disclosed embodiments. Other example systems and devices that can implement the disclosed embodiments include portable gaming devices, music players, data storage devices, and unmanned aerial vehicles.

It is noted that references in the specification to "one embodiment," "an embodiment," "an example embodiment," "exemplary," etc., indicate that the embodiment described can include a particular feature, structure, or characteristic, but every embodiment can not necessarily include the particular feature, structure, or characteristic. Moreover, such phases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

It is to be understood that the phraseology or terminology herein is for the purpose of description and not of limitation, such that the terminology or phraseology of the present specification is to be interpreted by those skilled in relevant art(s) in light of the teachings herein.

In some embodiments, the terms "about" and "substantially" can indicate a value of a given quantity that varies within 5% of the value (e.g., ±1%, 2%, ±3%, +4%, 5% of the value). These values are merely examples and are not intended to be limiting. The terms "about" and "substantially" can refer to a percentage of the values as interpreted by those skilled in relevant art(s) in light of the teachings herein. Furthermore, the terms "comprising," "including," "having," and the like, as used with respect to embodiments of the present disclosure, are synonymous.

As used hereinafter, including the claims, the term "unit", "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

It is to be appreciated that the Detailed Description section, and not the Abstract of the Disclosure section, is intended to be used to interpret the claims. The Abstract of the Disclosure section may set forth one or more but not all possible embodiments of the present disclosure as contemplated by the inventor(s), and thus, are not intended to limit the subjoined claims in any way.

The foregoing disclosure outlines features of several embodiments so that those skilled in the art may better understand the aspects of the present disclosure. Those skilled in the art will appreciate that they may readily use the present disclosure as a basis for designing or modifying other processes and structures for carrying out the same purposes and/or achieving the same advantages of the embodiments introduced herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:

1. A circuit, comprising:
a current source comprising a transistor having a first terminal electrically directly coupled to a voltage supply and configured to generate a first current with a first current rate-of-change during a time interval, wherein the transistor has a second terminal directly coupled to a ground signal; and
a load circuit having a terminal electrically coupled in parallel to the first terminal of the transistor and to the voltage supply and configured to generate a second current with a second current rate-of-change during the time interval, wherein the second current rate-of-change is based on an inverse of the first current rate-of-change.

2. The circuit of claim 1, wherein the current source further comprises a voltage sensor circuit coupled to a gate terminal of the transistor and configured to provide a sensed voltage of the gate terminal as an input to a control circuit.

3. The circuit of claim 1, further comprising:
a resistive power gate circuit coupled to the current source and load circuit, wherein the resistive power gate circuit is configured to measure a voltage drop across the resistive power gate circuit to control the current source.

4. The circuit of claim 1, wherein:
the first current has a first value at a beginning of the time interval and a second value at an end of the time interval; and
the second current has a third value at the beginning of the time interval and a fourth value at the end of the time interval, the first value being equal to the fourth value, and the second value being equal to the third value.

5. The circuit of claim 4, wherein the current source is further configured to generate a third current with a third current rate-of-change during an other time interval and having an opposite slope to that of the first current rate-of-change.

6. The circuit of claim 5, wherein an absolute value of the third current rate-of-change is less than an absolute value of the first current rate-of-change.

7. The circuit of claim 5, wherein the current source is further configured to generate a fourth current during a third time interval between the time interval and the other time interval, and wherein the third current has a value that is constant over the third time interval and is equal to the first value or the second value.

8. The circuit of claim 5, wherein the current source further comprises:
a second transistor configured to discharge a gate terminal of the transistor in response to the first current rate-of-change being negative; and
a third transistor configured to charge the gate terminal of the transistor in response to the first current rate-of-change being positive.

9. The circuit of claim 8, wherein the current source further comprises:
a capacitor coupled to the gate terminal of the transistor;
a fourth transistor configured to charge the gate terminal of the transistor and the capacitor in response to the third current rate-of-change being positive; and
a fifth transistor configured to discharge the gate terminal of the transistor and the capacitor in response to the third current rate-of-change being negative.

10. The circuit of claim 9, wherein the current source further comprises:
a transmission gate between the capacitor and the gate terminal of the transistor.

11. The circuit of claim 9, wherein the current source further comprises:

a sixth transistor configured to discharge the capacitor during the time interval in response to the first current rate-of-change being negative; and a seventh transistor configured to charge the capacitor during the time interval in response to the first current rate-of-change being positive.

12. A power supply system, comprising:

a power management unit configured to generate a power supply voltage at an output;

a current source comprising a transistor having a first terminal electrically directly coupled to the output and configured to generate a first current with a first current rate-of-change during a time interval, wherein the transistor has a second terminal directly coupled to a ground signal;

a load circuit having a terminal electrically coupled in parallel to the output and to the first terminal of the transistor and configured to generate a second current with a second current rate-of-change during the time interval, wherein the second current rate-of-change is based on an inverse of the first current rate-of-change; and a control circuit configured to control the first current rate-of-change during the time interval.

13. The power supply system of claim 12, further comprising:

a resistive power gate circuit coupled to the current source and the load circuit, wherein the resistive power gate circuit is configured to measure a voltage drop across the resistive power gate circuit to control the current source.

14. The power supply system of claim 12, wherein the current source comprises:

a voltage sensor circuit coupled to a gate terminal of the transistor and configured to sense voltage at the gate terminal.

15. The power supply system of claim 14, wherein the transistor is a first transistor, and wherein the current source further comprises:

a second transistor configured to discharge the gate terminal of the first transistor in response to the first current rate-of-change being negative; and a third transistor configured to charge the gate terminal of the first transistor in response to the first current rate-of-change being positive.

16. The power supply system of claim 15, wherein the current source further comprises:

a capacitor coupled to the gate terminal of the first transistor;

a fourth transistor configured to charge the gate terminal of the first transistor and the capacitor; and a fifth transistor configured to discharge the gate terminal of the first transistor and the capacitor.

17. The power supply system of claim 16, wherein the current source further comprises:

a transmission gate between the capacitor and the gate terminal of the first transistor.

18. A method, comprising:

generating, by a current source comprising a transistor having a first terminal electrically directly coupled to a voltage supply, a first current with a first current rate-of-change during a first time interval, wherein the transistor has a second terminal directly coupled to a ground signal;

generating, by a load circuit having a terminal electrically coupled in parallel to the first terminal of the transistor of the current source and to the voltage supply, a second current with a second current rate-of-change during the first time interval, wherein the second current rate-of-change is based on an inverse of the first current rate-of-change; and generating, by the current source, a third current with a third current rate-of-change during a second time interval and having an opposite slope to that of the first current rate-of-change.

19. The method of claim 18, further comprising:

generating a fourth current during a third time interval between the first time interval and the second time interval, and wherein the third current has a value constant over the third time interval.

20. The method of claim 18, further comprising:

providing a sensed voltage of a gate terminal of the transistor of the current source as an input to a control circuit; and controlling, by the control circuit and based on the sensed voltage, the first current rate-of-change during the first time interval.

* * * * *